Patented Dec. 14, 1948

2,455,937

UNITED STATES PATENT OFFICE

2,455,937

PREPARATION OF HARDENED POLYVINYL ALCOHOL COATINGS

Wesley G. Lowe, Rochester, N. Y., assignor to Eastman Kodak Company, Rochester, N. Y., a corporation of New Jersey No Drawing. Application October 23, 1944, Serial No. 560,026

8 Claims. (Cl. 260—29.2)

This invention relates to a method of preparing hardened polyvinyl alcohol coatings by incorporating into the coating composition a zirconium-poly alcohol complex.

Polyvinyl alcohol has been suggested for coating compositions and has been of interest for this purpose, particularly because of its water solubility characteristics. Because of these characteristics, however, the coating formed is not susceptible to treatment with water unless some precaution is taken to harden or insolubilize the polyvinyl alcohol employed. In my previous application Serial No. 519,339, filed January 22, 1944, I disclosed that polyvinyl alcohol coatings may be prepared by incorporating a small amount of zirconium nitrate in the coating composition, and after the coating is formed, gelling the same by fuming with ammonia. In that procedure, however, the addition of zirconium nitrate to the coating composition imparts acidity thereto and in cases where this is undesirable the method described in that application cannot be employed. Also, that method necessitates fuming with ammonia which constitutes an additional operation.

U. S. Patent No. 2,310,223 of Eaton and Crabtree describes a method of hardening polyvinyl alcohol coatings in which the coating is immersed in an aqueous solution of a zirconium compound. Obviously, in that case the hardening does not occur until the washing operation so that care must be exercised that the polyvinyl alcohol coating is kept dry until hardening is accomplished.

It is an object of my invention to provide a method of hardening polyvinyl alcohol in which no fuming or washing treatment is necessary. Another object of my invention is to provide a method of hardening polyvinyl alcohol coatings in which the coating composition is not decidedly acid, and, therefore, may be mixed with materials which are affected by decidedly acid conditions. Other objects of my invention will appear herein.

I have found that hardened polyvinyl alcohol coatings may be obtained by incorporating in a polyvinyl alcohol coating composition a small proportion of a zirconium-polyalcohol complex, which complex has no detrimental effect upon the polyvinyl alcohol composition previous to the coating operation, and yet upon drying the coating, the polyvinyl alcohol is found to be hardened or resistant to the effect of water whether at room temperature or hot.

I have found that it is possible to form a stable complex between a water-soluble zirconium salt, such as zirconium nitrate and a polyalcohol having the structure:

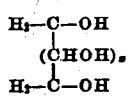

$x$ being either 0 or an integer. This polyalcohol forms a complex with the zirconium salt and thus permits the pH of a solution containing the zirconium salt and polyalcohol to be substantially raised without precipitating out zirconium oxide. By adding the solution of such a complex to an aqueous solution of polyvinyl alcohol, I have found that a hardening action occurs on the polyvinyl alcohol upon drying.

These hardening complexes are formed by adding polyalcohol to an aqueous solution of zirconium nitrate and raising the pH by addition of a base. Some of the polyalcohols which are suitable for use in this connection are ethylene glycol, glycerol, erythritol, arabitol, mannitol, or, in fact, any compounds which come under the formula which is given herein. I have found that the amount of alkali which may be added increases with an increase in the number of hydroxyls of the polyalcohol used. For instance, with the use of a given amount of mannitol, more alkali may be added to the polyvinyl alcohol coating composition than when a like amount of glycol is used, without causing precipitation in the solution. However, by employing a larger proportion of glycol the tolerance for alkali is increased and a higher pH may be attained. Also, an increase in the proportion of mannitol or any of the other polyalcohols will increase the proportion of alkali which may be incorporated without causing precipitation. By forming the zirconium-polyalcohol complex, the pH of the complex may be brought to a point by the addition of alkali that when mixed with a photographic emulsion using polyvinyl alcohol as the carrier it will have no detrimental effect upon the emulsion. For instance, many kinds of photographic emulsions are desensitized or otherwise detrimentally affected by acid conditions. The addition of alkali in the making of the complex referred to herein which is employed for hardening brings that value to a point where no detrimental effect is observed when the complex is added to photographic emulsions having a polyvinyl alcohol base.

It is preferred in preparing the hardening complex in accordance with my invention that the pH be brought to the highest possible value below that at which zirconium oxide begins to separate.

This complex composition is then in stable condition and can be kept for an extended period of time before use. In order to form a hardened polyvinyl alcohol coating, the solution of the complex is added to an aqueous solution of polyvinyl alcohol which is then coated out onto a surface and allowed to dry. The coating formed is insoluble in hot water.

The proportion of hardening agent or complex which is added depends on the degree of hardening of the polyvinyl alcohol coating which is desired. As a general rule, where a photographic paper is being prepared, it is desirable that the coating be quite resistant to the effects of heat. Therefore, with emulsions adapted for use in making photographic paper, it is usually desirable to use a greater proportion of the hardener than where the emulsion is employed in making photographic film. Any proportion of the complex will cause hardening of the polyvinyl alcohol coating the proportion used depending upon the degree of hardening desired.

The following examples illustrate my invention and teach the quantities of the various materials which would ordinarily be useful for proceeding in accordance with my invention.

Example 1

To 20 parts of a 10% solution of zirconium nitrate having a pH of 1.7, 2 parts of ethylene glycol was added. Four parts of 0.9 normal potassium hydroxide was added slowly with stirring and at this point it was found that no more alkali could be added without forming a non-soluble precipitate of zirconium oxide therein. The pH of this solution was now 2.9. One part of this solution was then added to 20 parts of a 5% solution of polyvinyl alcohol and the mixture was coated out onto a glass plate and allowed to dry. A film insoluble in hot water was formed thereby.

Example 2

Two parts of glycerol was mixed with 20 parts of a 10% solution of zirconium nitrate. There was then added to this mixture 0.9 normal potassium hydroxide up to the point where precipitation of the zirconium oxide occurred. In this case, 6 parts of the alkali solution could be added before this precipitation occurred. The pH of this solution was 3.2. One part of this solution was added to 20 parts of a 5% solution of polyvinyl alcohol and the solution was coated out and allowed to dry. A coating insoluble in hot water was obtained.

Example 3

Two parts of mannitol was added to 20 parts of a 10% solution of zirconium nitrate. It was found that 8.8 parts of 0.9 normal potassium hydroxide could be added before incipient precipitation of the oxide occurred. This brought the pH of the solution to 3.9. On adding this complex to a solution of polyvinyl alcohol in the same amount and manner as in the preceding examples, it was found that a similar hardening action occurred during drying. It was also found that the solution containing polyvinyl alcohol and the zirconium-mannitol complex could be treated with KOH to raise the pH to about 7 without gelation occurring. Thus a polyvinyl alcohol coating composition may have a pH of at least 7 or more without interfering with the use of that composition for coating purposes.

The proportion of the complex which is necessary to impart hardening to the polyvinyl alcohol coating is rather small. Proportions of 1% or even less may be employed and will evidence themselves in imparting some hardening to the polyvinyl alcohol coating. It is preferred, however, that a proportion of zirconium-polyalcohol complex within the range of 5 to 20% be employed, although larger quantities may be used and in some cases may even be desirable.

The proportion of complex solution used is dependent upon the concentration of the zirconium-polyalcohol complex in the solution as well as on the particular polyalcohol used in forming the complex. Ordinarily, taking the mixture of zirconium salt and polyalcohol as the basis, the use for example of .4 part of the mixture to 1 part of the polyvinyl alcohol in the coating composition is satisfactory but other proportions may be employed to achieve the desired results without departing from the spirit of my invention.

The proportion of polyalcohol mixed with zirconium salt depends upon the degree to which a rise in pH is desired, and the particular polyalcohol being used. Ordinarily an amount of polyalcohol equal to that of the zirconium salt is sufficient, regardless of the polyalcohol employed. When the complex is to be used in a composition such as a photographic emulsion where a low pH will have a bad effect it is particularly desirable that the amount of polyalcohol be such that a substantial raise in pH of the complex is possible without precipitating zirconium. In cases where a low pH is not particularly bad, the proportion of polyalcohol employed may be quite small.

Any of the water-soluble zirconium salts may be employed in forming the complex among which are the nitrate, oxychloride, sulfate and citrate of zirconium. If the complex is to be used in photographic emulsions, ions which would be derogatory such as chlorides or iodides should be avoided in preparing the complex.

This term "polyvinyl alcohol" is to be understood as including material referred to commercially as polyvinyl alcohol, which ordinarily is made up in addition to the polyvinyl alcohol of up to 5% of other units such as of polyvinyl acetate.

Besides being of value for ordinary polyvinyl alcohol coating compositions, my invention is particularly of value for use in photographic emulsions in which polyvinyl alcohol is employed as the carrier for the silver halide, such emulsions being described, for instance, in my U. S. Patents Nos. 2,311,058 and 2,311,059. Often, photographic papers are subjected to ferrotyping on a hot drum which necessitates resistance to heat. It is desirable that the emulsion thus treated be of the hardened type, such as prepared in accordance with my invention. Also in processing photographic emulsions, it is sometimes desirable to subject the emulsions to solutions having a temperature of greater than 70° F. My invention provides a method for hardening polyvinyl alcohols so that emulsions in which polyvinyl alcohol is employed as the carrier for the silver halide may be safely processed.

I claim:

1. A method of preparing hardened polyvinyl alcohol coatings which comprises incorporating in an aqueous solution of polyvinyl alcohol a water-soluble complex essentially consisting of zirconium nitrate, ethylene glycol in an amount sufficient to prevent the precipitation of zirconium oxide in the complex at a pH of at least 2.9, and an inorganic water-soluble base in an amount sufficient to raise the pH to at least 2.9 but insufficient to precipitate zirconium oxide from the mixture, coating out the solution upon a surface, and drying the same.

2. A method of preparing hardened polyvinyl alcohol coatings which comprises incorporating in an aqueous solution of polyvinyl alcohol a water-soluble complex essentially consisting of zirconium nitrate, glycerol in an amount sufficient to prevent the precipitation of zirconium oxide in the complex at a pH of at least 2.9, and an inorganic water-soluble base in an amount sufficient to raise the pH to at least 2.9 but insufficient to precipitate zirconium oxide from the mixture, coating out the solution upon a surface, and drying the same.

3. An article of manufacture having thereon a coating of polyvinyl alcohol hardened by a water-soluble complex essentially consisting of water-soluble zirconium salt, ethylene glycol in an amount sufficient to prevent the precipitation of zirconium oxide in the complex at a pH of at least 2.9, and alkali in an amount sufficient to raise the pH to at least 2.9 but insufficient to precipitate zirconium oxide from the mixture.

4. An article of manufacture having thereon a coating of polyvinyl alcohol hardened by a water-soluble complex essentially consisting of water-soluble zirconium salt, glycerol in an amount sufficient to prevent the precipitation of zirconium oxide in the complex at a pH of at least 2.9, and alkali in an amount sufficient to raise the pH to at least 2.9 but insufficient to precipitate zirconium oxide from the mixture.

5. A method of preparing hardened polyvinyl alcohol coatings which comprises incorporating in an aqueous solution of polyvinyl alcohol a water-soluble complex produced by mixing a water-soluble zirconium salt with a polyhydroxy alcohol having the formula:

$x$ being 0 to 4 the amount of polyhydroxy alcohol added being sufficient that a pH of at least 2.9 can be reached by the addition of an inorganic base without precipitating zirconium oxide, and an inorganic water-soluble base in an amount sufficient to raise the pH to at least 2.9 but insufficient to precipitate zirconium oxide from the mixture, coating out the solution upon a surface and drying the coating.

6. The method of preparing a hardener for aqueous polyvinyl alcohol coating compositions which comprises mixing an aqueous solution of a water-soluble zirconium salt with a polyhydroxy alcohol having the formula:

$x$ being 0 to 4 the amount of polyhydroxy alcohol added being sufficient that a pH of at least 2.9 can be reached by the addition of an inorganic base without precipitating zirconium oxide and adding thereto an inorganic water-soluble base in an amount sufficient to raise the pH to at least 2.9 but insufficient to precipitate zirconium oxide from the mixture.

7. An article of manufacture having thereon a coating of polyvinyl alcohol hardened by a water-soluble complex produced by mixing together a water-soluble zirconium salt, a polyhydroxy alcohol having the formula:

$x$ being 0 to 4 the amount of polyhydroxy alcohol added being sufficient that a pH of at least 2.9 can be reached by the addition of an inorganic base without precipitating zirconium oxide, and alkali in an amount sufficient to raise the pH to at least 2.9 but insufficient to precipitate zirconium oxide from the mixture.

8. An article of manufacture having thereon a coating of polyvinyl alcohol containing therein 5–20% of a water-soluble complex produced by mixing together a water-soluble zirconium salt, a polyhydroxy alcohol having the formula:

$x$ being a value from 0 to 4 the amount of polyhydroxy alcohol added being sufficient that a pH of at least 2.9 can be reached by the addition of an inorganic base without precipitating zirconium oxide, and an alkali in an amount sufficient to raise the pH to at least 2.9 but insufficient to precipitate zirconium oxide from the mixture.

WESLEY G. LOWE.

REFERENCES CITED

The following references are of record in the file of this patent:

UNITED STATES PATENTS

| Number | Name | Date |
| --- | --- | --- |
| 2,310,223 | Eaton et al. | Feb. 9, 1943 |